Nov. 6, 1928.　　　　　A. M. BABITCH　　　　1,690,358
FILTER
Filed June 3, 1926　　　2 Sheets-Sheet 1

Inventor
Abraham M. Babitch
By Blackmore, Spencer & Heil
Attorneys

Nov. 6, 1928.
A. M. BABITCH
1,690,358
FILTER
Filed June 3, 1926    2 Sheets-Sheet 2
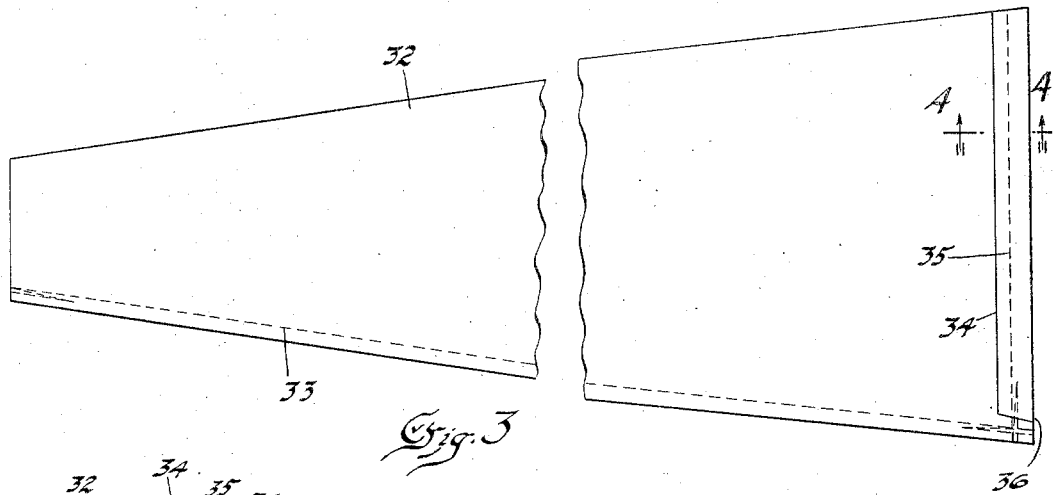
Fig. 3
Fig. 4
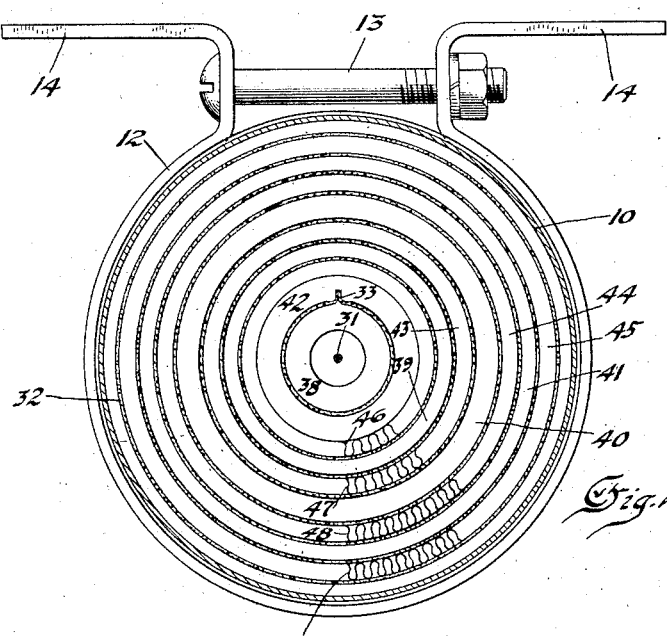
Fig. 2
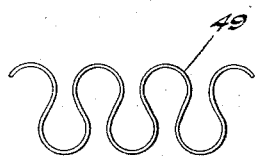
Fig. 5
Inventor
Abraham M. Babitch
By Blackmore, Spencer & Flint
Attorneys Patented Nov. 6, 1928.

1,690,358

UNITED STATES PATENT OFFICE.

ABRAHAM M. BABITCH, OF FLINT, MICHIGAN, ASSIGNOR TO A C SPARK PLUG COMPANY, OF FLINT, MICHIGAN, A COMPANY OF MICHIGAN.

FILTER.

Application filed June 3, 1926. Serial No. 113,491.

The invention relates to filters and is of a special utility in connection with filters of the relatively small portable type such as may be employed, for example, in filtering oil in connection with the lubrication of internal combustion engines forming part of the power plant of an automobile.

The principal object of the invention is to provide an especially simple and inexpensive filter adapted to expose a relatively large area of filtering material within a small volume.

Other objects and advantages will appear from the following description taken in connection with the accompanying drawings, in which Figure 1 is a longitudinal section through a filter embodying one form of the invention.

Figure 2 is a horizontal section on line 2—2 of Figure 1.

Figure 3 is a plan view of a filter bag constituting a part of the invention.

Figure 4 is a section on line 4—4 of Figure 3.

Figure 5 is an enlarged view of a portion of a spacing element.

Figure 1:
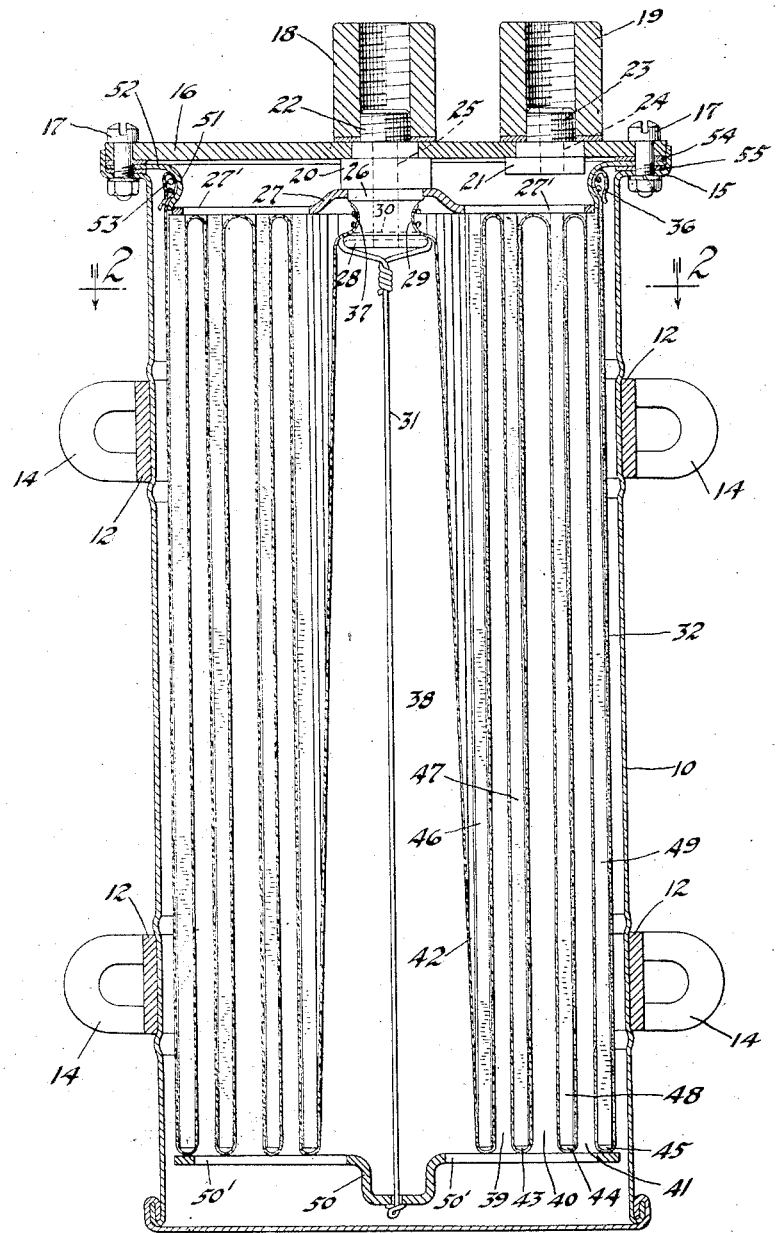

Referring to the drawings:

10 indicates a container or can which may be of sheet metal with a permanently attached bottom end closure 11. Suitable means may be provided for securing the container to a base or support, which means comprises, in the form illustrated, bands 12 clamped to the container by bolts 13 and provided with perforated arms 14 whereby the entire assembly may be secured to a vehicle dash or other support. The wall of the container is flanged outwardly at the upper end, as indicated at 15, thus providing a seat for the reception of the cover 16 which may be secured to the outwardly flanged portion of the receptacle by bolts 17.

Upon the cover 16 are mounted inlet and outlet fittings 18 and 19 which comprise internally threaded sleeves secured to the cover by sleeve nuts 20 and 21 shouldered to fit against the lower face of the cover and provided with screw threaded extensions 22 and 23 passing through apertures in the cover and engaging the screw threaded bores of the fittings 18 and 19, respectively.

The member 21 is provided with a central passage 24 through which filtered material may flow from the interior of the container 10, which material may be delivered to any desired point by a conduit leading from the fitting 19. The member 20 is also provided with a central passage 25 permitting the flow of material to be filtered from any desired source to the interior of the container. Member 20 is also formed with a reduced portion at the lower or inner end, thus providing a shoulder 26 serving as an abutment against which is fitted an end plate 27, the end plate being perforated to pass over the reduced end portion of the nut 20. The extreme inner end of the nut is enlarged to form a head 28 between which and the shoulder 26 is a neck 29 of smaller diameter. A hole 30 is also provided extending transversely through the end of the nut 20 to receive a fastening wire 31.

The filter body proper comprises a tubular bag 32 of tapering or frusto conical formation and made of material fitted for the purpose intended. If the filter is designed for the removal of impurities from lubricating oil, for example, the filter bag may be of a suitable quality of canton flannel. It may be formed from a sheet of the material having its edges sewed together as indicated at 33 and with the edge at the larger end folded over, as at 34, and stitched down at 35 to provide a hem 36, through which a fastening wire may be passed. The smaller end of the bag is of a size adapted to fit the neck 29 of the sleeve nut 20 and when the parts are assembled the bag is secured firmly to the neck of the nut by suitable clamping means, as by a wire 37.

The length of the bag may be several times that of the space within which it is to be positioned in use since its conical or tapering form permits it to be folded back and forth the requisite number of times to form successive pockets or annular spaces of successively increasing diameters all lying within the largest portion of the bag. By reference to Figure 1 it will be seen that the bag, when thus folded, presents a central space 38 within the portion of smallest diameter and a series of annular pockets 39, 40, 41, all on the inlet side of the bag, and a second series of pockets 42, 43, 44 and 45 on the opposite or outlet side of the bag. In order to maintain the folds in position spacing elements 46, 47, 48, 49 are positioned in the pockets 42, 43, 44, 45 respectively. These spacing elements are tubular and are, of course, successively of increasing diameter to provide clearance between them for the pockets 39, 40, 41, respectively. The spacers will be of sufficiently rigid material for the purpose and may be of sheet metal corrugated, as shown in Figure 2 and on enlarged scale in Figure 5. The corrugations provide channels for the escape of the filtered material as it passes through the walls of the filter bag.

In the assembly, as illustrated in Figure 1, the spacing elements engage at their upper ends with the plate 27 and are held in position by a second plate 50 engaging the filter bag and acting against the lower ends of the spacing elements. The plate 50 is held in position by the fastening wire 31 which passes through a central perforation in the plate. Suitable pressure being applied by the clamping action of the wire 31, the successive folds of the bag are pressed against the lower ends of the spacing elements and the latter held firmly in contact with the upper plate 27. The plates 27 and 50 are provided with slots 27', 50' to permit free passage therethrough of the material being filtered. The outer or larger section of the bag 32 is secured by positioning the hem 36 within a channel 51 in a ring 52, as by a fastening wire 53 passed through the hem. The ring 52 may be secured between the cover and the container, as by providing the ring with apertures through which the bolts 17 extend. By this arrangement the tightening up of the bolts 17 secures the cover to the can and also secures the ring 52 in position, suitable gaskets 54, 55, being provided, above and below the ring respectively, to prevent leakage.

In the construction as described, it will be noted that the annular pockets 39, 40, 41 on the inlet side of the filter are wholly open and unobstructed, being maintained distended by the pressure of the material being filtered. Hence they not only permit free flow of the material to be filtered to every part of the surface of the filter bag on the inlet side but also provide ample space for accumulation of residue, thereby affording high capacity and extended life for the filtering body. The corrugated construction of the spacing elements also permits ready discharge of the filtered material which may pass through the walls of the filtering body. I thus secure a very great efficiency and capacity in proportion to the area of the filter body, and also in proportion to the size of the filter as a whole.

It will be understood that various changes and details of construction may be made without departing from the spirit and scope of the invention, and therefore I do not desire to be limited to the specific structure herein described except as required by the language of the appended claims in view of the prior art.

I claim:

1. A filter comprising a container, a cover therefor, inlet and outlet connections carried by said cover, a ring in said container, a tapered filter bag in said container having its smaller end secured to said inlet connection and its larger end to said ring, said bag folded back and forth to form a plurality of annular pockets opening alternately on the inlet and outlet sides of said filter, tubular spacers positioned in the pockets on the outlet side, and means for holding said bag and spacers in assembled relation.

2. Structure as set forth in claim 1, said holding means comprising end plates, one supported upon the cover, and means for securing the other thereto.

3. A filter comprising an end member having inlet and outlet fittings one of which is centrally disposed, a conical filter bag having its smaller end secured to said central fitting and its larger end secured to said member, the intermediate portion of said bag being folded back and forth to form annular pockets, annular distending members in said pockets on the outlet side, a support for said distending members and means for securing said support to said end member.

4. A filter comprising a container, a cover therefor, having an outlet fitting and a central inlet fitting, a ring secured to said cover, a conical filter bag having its smaller end secured to said inlet fitting and its larger end to said ring, the intermediate portion of the bag being folded back and forth to form annular pockets, annular spacers in the pockets on the outlet side, and means for clamping said spacers to said cover, whereby the cover, the bag and the spacers form an assembly capable of being inserted into or removed from the container as a unit.

In testimony whereof I affix my signature.

ABRAHAM M. BABITCH.